United States Patent Office

2,725,350
Patented Nov. 29, 1955

2,725,350

PURIFICATION OF TITANIUM TETRACHLORIDE

Joseph Peppo Levy, London, England

No Drawing. Application December 15, 1952,
Serial No. 326,135

Claims priority, application Great Britain
December 18, 1951

6 Claims. (Cl. 202—52)

This invention relates to the purification of titanium tetrachloride and silicon tetrachloride.

There is at present a considerable demand for pure colourless titanium tetrachloride as starting material for the production of pure titanium metal and also for titanium oxide pigment known as titanium white. Similarly, there is a considerable demand for pure silicon tetrachloride as starting material in the production of silicones and various silicon organic compounds.

The present invention will be described with relation to the purification of titanium tetrachloride, although precisely the same treatment may be applied to silicon tetrachloride as the two chlorides behave very similarly with regard to impurities, but silicon tetrachloride is easily separable from titanium tetrachloride when the two occur together owing to the big difference in the boiling points, titanium tetrachloride boiling at 136° C. and silicon tetrachloride at 56.8° C. Both chlorides are prepared by similar methods, titanium tetrachloride being produced by heating titanium-containing ores in a current of chlorine in the presence of carbon and silicon tetrachloride being produced from ferro-silicon by heating in a current of chlorine.

Titanium tetrachloride as ordinarily produced commercially is usually coloured anything from a pale yellow to dark brown as a result of small quantities of impurities, and many attempts have been made to evolve a satisfactory commercial process for producing from the commercial product colourless titanium tetrachloride (see, for example, Report No. 4153 of the Bureau of Mines, U. S. Department of the Interior).

Ordinary distillation will separate coloured constituents but a very efficient rectifying column is required with a large number of plates and large reflux ratio so that attempts to obtain pure colourless titanium tetrachloride in this way on a commercial scale have not met with any success, and in any case it does not appear to be possible to separate vanadium chloride from titanium chloride in any ordinary apparatus by direct distillation. The proposal has been made for treating titanium tetrachloride with hydrogen sulphide, but for large scale operation this method introduces a number of chemical engineering problems, and from the purely chemical standpoint it produces a number of uncertainties, for example, in connection with the free chlorine present in commercial titanium tetrachloride and the removal of excess hydrogen sulphide.

Copper has been successfully employed for purifying titanium tetrachloride, but it was found that ordinary copper turnings were not very effective and copper powder prepared by reducing finely ground copper oxide has been proposed and appears to have met with greater success. In using finely powdered metallic copper, however, vigorous stirring was still found to be necessary and periodic intervals for settling so that the colour of the liquid could be observed. The copper turns black during the treatment and during the settling it forms a hard cake and this cake contains up to 75% of its weight of titanium tetrachloride which has to be driven off by heating. Moreover, the apparatus involves high speed stirring arrangements and a complicated device for raking out the copper sludge into a recovery tank.

It has now been found that copper in the form of turnings or large pieces can be very successfully employed if the surface of the copper is suitably activated before contacting with the titanium tetrachloride. Thus, for example, it has been found that if the copper (irrespective of whether it is in the form of powder or otherwise) is treated with acetone and without coming into contact with the air is then heated in a vacuum to volatilise off the acetone and then the titanium tetrachloride is introduced into the same vessel containing the so treated copper, the surface of the copper immediately becomes blackened and within a few minutes with gentle agitation the titanium tetrachloride may be decanted off and then only requires a simple distillation to separate any silicon tetrachloride and residual copper and a fully colourless pure titanium tetrachloride is obtained.

It has also been found that any scrap copper of a purity conforming to the ordinary standards for commercially pure copper can be used and that the crystal form and small amounts of impurity which such copper contains have no effect on its use for the purpose of the present invention.

There are, of course, numerous other ways of treating the copper in order to make it active in purifying titanium tetrachloride. Thus, it may be treated with methyl alcohole or any low molecular alcohol, aldehyde or ketone.

Alternatively, by inorganic reagents to produce a similar surface on the copper, for example, it may be treated with a dilute solution of iodine to produce a grey coating on the copper which is subsequently removed by hydrogen chloride, both the iodine and the hydrogen chloride are dissolved in a volatile solvent such as acetone to facilitate washing away of the by-products and drying without heating and exposure to the atmosphere. In this way, alloys with a high content of copper may be rendered active. A suitable surface can also be produced by treating the copper with a 15% solution of ammonium persulphate in .880 ammonia which etches the copper in a way which leaves the surface in a particularly suitable condition of sponginess. After thorough washing this spongy surface is then finally treated with acetone. The deposition of copper on to a suitable carrier metal, for example, on steel wire wool, turnings or drillings also provides a particularly useful form of copper for the purpose of the present invention, as will be shown hereinafter when describing preferred ways of carrying out the invention. In fact any method by which the surface of copper may be rendered active for catalytic purposes will render it suitable for the purpose of the present invention although the purification of titanium chloride is not believed to depend on any catalytic action.

According to the present invention, therefore, a process for the purification of titanium tetrachloride comprises bringing the said chloride into contact with activated metallic copper as above defined, the said activated copper being kept out of contact with the air prior to use for contacting with the titanium chloride; and finally distilling the treated titanium chloride.

The treatment according to the invention is preferably carried out in the liquid phase, it may be carried out in the vapour phase but a certain amount of time is required to complete the action and it is more conveniently carried out in the liquid phase by refluxing the tetrachloride in the presence of the copper, when by increasing the rate of boiling from time to time the liquid which collects in the condenser can be observed and will be found to get progressively lighter in colour until it becomes indistinguishable from the cooling water.

A further advantage of carrying out the purification in the liquid phase is that in any given interval of time there are far larger numbers of molecular collisions between the tetrachloride molecules and the active metal surface than would similarly obtain in the gaseous phase.

The purified tetrachloride may be distilled directly from the vessel containing the copper but it may conveniently be decanted away from the copper and distilled from another vessel and fresh tetrachloride refluxed with the copper.

It is not necessary to change the copper until it has been used for repeated batches for a considerable time, in fact provided the black deposit is not allowed to dry on the surface of the copper, the latter gives progressively improved results in more rapid initiation of the action and shorter refluxing time with repeated use.

Eventually, however, the impurities taken out of titanium tetrachloride build up and the normal increase in the thickness of the film causes the film to attain a thickness which inhibits contact of the titanium tetrachloride with the activated surface of the copper and the copper should then be regenerated. The inclusion of sharp inert solid particles, for example, sand or quartz dust in the liquid titanium tetrachloride causes an abrading action on the protective film formed and increases the time the copper can be used before regeneration is necessary.

It is, of course, highly important to prevent moisture or moist air coming into contact with the tetrachloride as otherwise hydrolysis occurs and the active copper may become coated with titanium oxide and in any case oxychlorides will be formed which dissolve in the tetrachloride and give a yellow colour.

The process according to the invention enables a very simple purification of commercial titanium chloride to be carried out as all that is necessary is to fill into a reaction vessel steel wire wool coated with copper or pieces of commercially pure copper together with acetone and then to evacuate the acetone from the vessel while maintaining a vacuum therein, during which the copper is heated to remove the acetone and then the titanium chloride is admitted to the reaction vessel and gently agitated therein with the treated copper and refluxed until colourless, after which the titanium chloride may be simply decanted from the pieces of copper or copper-coated steel and submitted to a simple distillation and fresh titanium tetrachloride admitted to the reaction vessel. Any silicon tetrachloride present will come over in the early stages of the distillation and can be separately collected while any impurity precipitated by the copper, which does not remain attached to the copper, will remain in the residue in the distillation vessel. The treatment of the titanium chloride with the copper is best carried out at somewhat elevated temperature in order to accelerate the reaction. The copper remaining behind in the reaction vessel when spent can be easily regenerated for further operations by washing with dilute acid and then treating again with acetone and decanting off the acetone and heating the copper in vacuo.

As above pointed out, the copper may be deposited chemically or electrolytically on to mild steel wool, turnings or drillings, and this enables the invention to be carried out in a particularly simple manner in which the steel wool, after deposition of the copper, is packed into a reaction vessel in the form of a Thiele tube and treated therein first of all with acetone and after removing the acetone under vacuum, the titanium tetrachloride is filled into the reaction vessel and refluxed therein and maintained in rapid circulation by convection currents, and it can be readily seen when the titanium tetrachloride is sufficiently pure by the colour of the circulating liquid. When the copper-coated wire shows signs of decreased activity, it can be readily replaced without loss by stripping the copper from the steel wool with a solution of ammonium persulphate (e. g. a 15% solution) in ammonia solution of .880 specific gravity which readily strips off the copper deposited without affecting the steel wool. In this way a very large surface of activated copper can be presented to the titanium tetrachloride, and the copper is practically entirely used up in the treatment and fresh deposits of copper can be readily produced and treated with acetone for further operation.

When using copper-coated steel wire wool, further additional agitation may be provided by an intermittent magnetic field applied to one or other extremity of a glass reaction vessel.

I claim:

1. A process for the purification of titanium tetrachloride which comprises contacting the said chloride with copper which has been rendered catalytically active by treatment with a substance selected from the group consisting of volatile alcohols, aldehydes and ketones, the said substance being volatilised off under vacuum and the copper being kept out of contact with the atmosphere prior to use, and finally distilling the treated titanium tetrachloride.

2. A process for the production of titanium tetrachloride which comprises contacting the said chloride with copper which has been rendered catalytically active by treatment with acetone and volatilisation of the acetone under vacuum, the copper being kept out of contact with the atmosphere prior to use, and then distilling the treated titanium tetrachloride.

3. A process for the purification of titanium tetrachloride which comprises contacting the said chloride in the liquid phase with copper which has been rendered catalytically active by treatment with acetone and volatilisation of the acetone under vacuum, the copper being kept out of contact with the atmosphere prior to use, and then distilling the treated titanium tetrachloride.

4. A process for the purification of titanium tetrachloride which comprises contacting the said chloride with copper electrolytically deposited on a support, the said copper having been rendered catalytically active by treatment with acetone and volatilisation of the acetone under vacuum, the copper being kept out of contact with the atmosphere prior to use, and then distilling the treated titanium tetrachloride.

5. A process for the purification of titanium tetrachloride as claimed in claim 4, wherein the support for the copper is steel wire wool.

6. A process for the purification of titanium tetrachloride as claimed in claim 4, wherein the deposit of copper, when it shows decreased activity, is removed from the support by treatment with a solution of ammonium persulphate in ammonium hydroxide and thereafter a fresh deposit is formed thereon and rendered catalytically active.

References Cited in the file of this patent

UNITED STATES PATENTS

| | | |
|---|---|---|
| 706,498 | Stoddard et al. | Oct. 29, 1946 |
| 2,530,735 | Schumann | Nov. 21, 1950 |
| 2,649,418 | Stehman | Aug. 18, 1953 |
| 2,650,204 | Reynolds et al. | Aug. 25, 1953 |